US008089397B2

(12) United States Patent
Laurichesse et al.

(10) Patent No.: US 8,089,397 B2
(45) Date of Patent: Jan. 3, 2012

(54) METHOD FOR PROCESSING RADIONAVIGATION SIGNALS

(75) Inventors: Denis Laurichesse, Tournefeuille (FR); Flavien Mercier, Auzeville (FR)

(73) Assignee: Centre National d'Etudes Spatiales (FR)

( * ) Notice: Subject to any disclaimer, the term of this patent is extended or adjusted under 35 U.S.C. 154(b) by 217 days.

(21) Appl. No.: 12/532,514

(22) PCT Filed: Mar. 28, 2008

(86) PCT No.: PCT/EP2008/053745
§ 371 (c)(1),
(2), (4) Date: Nov. 17, 2009

(87) PCT Pub. No.: WO2008/125458
PCT Pub. Date: Oct. 23, 2008

(65) Prior Publication Data
US 2010/0085252 A1    Apr. 8, 2010

(30) Foreign Application Priority Data

Mar. 29, 2007    (FR) ...................................... 07 54139

(51) Int. Cl.
*G01S 19/41*    (2010.01)
(52) U.S. Cl. .................................................. 342/357.24
(58) Field of Classification Search .............. 342/357.24
See application file for complete search history.

(56) References Cited

U.S. PATENT DOCUMENTS

| 5,148,179 | A | 9/1992 | Allison |
| 2006/0164297 | A1* | 7/2006 | Hernandez-Pajares et al. ................ 342/357.03 |
| 2006/0209634 | A1* | 9/2006 | Vigen ............................ 367/21 |
| 2008/0122688 | A1* | 5/2008 | Hatch ..................... 342/357.06 |

OTHER PUBLICATIONS

International Search Report PCT/EP2008/053745; Dated May 13, 2008.
Helmut Blomenhofer, et al., "Development of a Real-Time DGPS System in the Centimeter Range", Position Location and Navigation Symposium 1994, Apr. 11, 1994, pp. 532-539.
Jingrong Cheng, et al., "Aided Integer Ambiguity Resolution Algorithm", Position Location and Navigation Symposium, 2004, pp. 740-745.
Michael J. Gabor, et al., "GPS Carrier Phase Ambiguity Resolution Using Satellite-Satellite Single Differences", ION GPS 99, Sep. 14-17, 1999, Nashville TN, XP002460088.
Michael J. Gabor, et al., "Characteristics of Satellite-Satellite Single Difference Widelane Fractional Carrier Phase Bias", ION GPS 200, Sep. 19-22, 2000, Salt Lake City, UT, XP002460089.

* cited by examiner

Primary Examiner — Harry Liu
(74) Attorney, Agent, or Firm — Cantor Colburn LLP

(57) ABSTRACT

The satellites of a constellation of satellites each transmit, on distinct frequencies, a first and a second radionavigation signal, respectively. Each station of a reference network from which a satellite is visible performs non-differentiated measurements of code and phase for each of the two signals originating from the satellite and deduces therefrom a raw value of the widelane ambiguity. An internal delay of the satellite and a whole value of the widelane ambiguity are determined, in the network, on the basis of this raw value. The method comprises the steps: -receiving the first and second radionavigation signals at the level of the reference receiver; -performing, with the aid of the reference receiver and for each of the first and second signals received, a non-differentiated measurement of code and a non-differentiated measurement of phase; -calculating the raw value of the widelane ambiguity on the basis of the non-differentiated measurements of code and phase; and -fixing the internal delay of the satellite and the whole value of the widelane ambiguity on the basis of the raw value for the reference receiver.

15 Claims, 2 Drawing Sheets

METHOD FOR PROCESSING RADIONAVIGATION SIGNALS

TECHNICAL FIELD OF THE INVENTION

The present invention relates to the field of radionavigation systems or positioning by satellite, in particular a method of processing radionavigation signals transmitted by the satellites of such a system.

BRIEF DESCRIPTION OF RELATED ART

The satellite positioning systems such as GPS (Global Positioning System), Galileo, GLONASS, QZSS, Compass, IRNSS and others use modulated radionavigation signals called "spread spectrum modulation". These signals essentially carry pseudo random codes formed from periodically repeating numerical sequences, whose principal function is to allow Code Division Multiple Access (CDMA) and to supply a measurement of the signal propagation time transmitted by the satellite. Incidentally, the radionavigation signals can also carry a payload.

The radionavigation signals are formed by modulation of the central (carrier) frequencies. In the case of GPS, the radionavigation signals are transmitted in the frequency bands L1, centred on 1575.42 MHz and L2, centred on 1227.6 MHz. The band L5, centred on 1176.45 MHz, was added when the GPS was updated. The satellites of the Galileo constellation will transmit in the bands E2-L1-E1 (the portion of the middle band L1 being the same as that of GPS), E5a (which, pursuant to the Galileo nomenclature, represents the band L5 destined for GPS), E5b (centred on 1207.14 MHz) and E6 (centred on 1278.75 MHz).

The basic measurements that can be carried out by a receiver include code measurements and carrier phase measurements. These basic measurements can, of course, be combined with each other. The code measurements are accurate to 1 metre whereas the phase measurements are accurate to some mm. However, phase measurements have the disadvantage that they provide only the real part of the phase difference of the carrier between the transmission by the satellite and the receiver. Consequently, the phase measurements are ambiguous in that the number of complete cycles between the satellite and the receiver are initially unknown. In order to be able to profit from the precision of the phase measurements, a receiver must resolve the ambiguities inherent in these phase measurements.

The phase ambiguities are usually resolved by differentiation of the phase measurements (simple or double differentiation). A method that uses simple differences between satellites is described for example in the article "GPS carrier phase ambiguity resolution using satellite-satellite single differences" by M. J. Gabor and R. S. Nerem, ION GPS '99, 14-17 Sep. 1999, Nashville, Tenn. The differentiation enables the (non modelised) causes of errors, which are common to a plurality of measurements, to be eliminated, and thereby reveals a complete information, which when taken into account, further improves the performance. However, this complete information consists of the differences from one or a plurality of basic ambiguities of phase, and in general does not enable the basic ambiguities of phase to be traced.

BRIEF SUMMARY OF THE INVENTION

The invention proposes a method for resolving the ambiguity of phase of non-differentiated measurements made by a receiver (on the ground or in orbit), starting from raw code and phase measurements. The invention enables a receiver to independently find the non-ambiguous value or values of phase, i.e. without necessarily using one or a plurality of differentiations of measurements on a local or global network.

Generally, the invention comprises two components. Firstly, it comprises a method that runs at the level of a network of reference stations, during which additional information is determined, with which a user's receiver that does not belong to the network can resolve the ambiguities of phase. Secondly, the invention comprises the method that runs at the level of the receiver that is not part of the network that uses the additional information generated by the network of reference stations and provided by any type of communication path.

In a first aspect, the invention relates, at the level of a network of stations (reference receivers), comprising at least one station, to the determination of a satellite delay corresponding to a time lag and/or an interfrequency bias and/or a difference of the phase centres of the non-compensated respective frequencies, on the satellite, between the code and the phase of a radionavigation signal. In the following, one assumes the case of a constellation of radionavigation satellites whose satellites each transmit at least two radionavigation signals in two distinct frequency bands. Thus, each satellite emits at least a first radionavigation signal on a first frequency and a second radionavigation signal on a second frequency that is distinct from the first. Each station from which a satellite is visible (i.e. above the horizon) can carry out code and phase measurements for each of the two signals coming from the relevant satellite and can deduce a raw value for the wide-lane ambiguity. Based on this raw value for the wide-lane ambiguity, an internal satellite delay and a complete value for the wide-lane ambiguity are then determined for the reference network. It should be noted that the code and phase measurements in this case are non-differentiated measurements (i.e. neither differentiated between stations nor between satellites). It is apparent here that the internal satellite delays influence the measurements of a plurality of receivers in the same way and therefore disappear by differentiating the measurements between two receivers. Consequently, the methods based on differentiation of the measurements do not require the internal satellite delay or delays to be known. In contrast, the method according to the invention uses non-differentiated measurements and precisely proposes to determine the internal satellite delay.

This method comprises, notably, the following steps:
receive the first and second radionavigation signals at the level of the reference receiver;
by means of the reference receiver and for each of the first and second received signals, execute a non-differentiated code measurement and a non-differentiated phase measurement;
calculate the raw value of the wide-lane phase ambiguity from the code measurements (non-differentiated) and from the phase measurements (non-differentiated); and
fix the internal satellite delay together with the integer value of the wide-lane phase ambiguity based on the raw value for the reference receiver.

Preferably, the internal satellite delay together with the integer value of the wide-lane phase ambiguity are determined for each available satellite/station combination (for a given date the satellites are not all visible from each station), from the code and phase measurements executed for each of the first and second signals originating from the respective satellite by means of the respective reference receiver. This is made in a coherent manner at the level of the reference network such that a set of self-coherent satellite delays and station delays is obtained.

A second aspect of the invention relates to the determination of precise satellite clocks at the level of the reference network. In this method, one receives the first and second radionavigation signals at the level of the stations; one executes, for each of the received first and second signals, a non-differentiated code measurement and a non-differentiated phase measurement; and one determines a satellite clock value from the non-differentiated code measurements, the non-differentiated phase measurements, one or a plurality of integer values of the wide-lane ambiguity as well as a model of the propagation distance between the satellite and the reference receiver or receivers. In order to determine the integer values of the wide-lane ambiguity, one obtains the internal satellite delays or one calculates them as indicated above, and then one deduces the integer values from the raw measurements of the wide-lane ambiguity with the help of the internal satellite delays. The model of the propagation distance can bring into play, notably, the precise orbit of the satellite, the tropospheric delay, the position of the station taking into account the tides etc. The precise orbits can be provided as an input if such orbits are available. Alternatively, the precise orbits can be estimated during filtering.

The satellite clocks value and, if necessary, the precise orbits of the satellites of a constellation are preferably estimated by filtering from a set of code and phase measurements on a group of stations (typically 50 stations). The model parameters adjusted during a filtering of this type are the broadcasting clocks and receivers at each epoch, a tropospheric bias that varies slowly over the day by station, and the narrow-lane ambiguities (a parameter identified on each passage). The determination of the clock value preferably comprises the estimation of the model parameters of the propagation distance (such as e.g. the precise orbit of the relevant satellite) with the help of the un-differentiated code measurements, the un-differentiated phase measurements and one or a plurality of integer values of the wide-lane ambiguity and subsequently the estimation of the clock value from the estimated parameters.

According to a simple filtering algorithm that will be described in more detail below, one resolves firstly the set of the problem with the floating ambiguities, such that the parameters of the model, such as the tropospheric delay and/or a precise orbit etc. are identified with a sufficient accuracy. The narrow-lane ambiguity is then expressed as a function of the phase measurements, the identified model and the satellite clocks and the receiver clocks.

It can be appreciated that the fact of having previously identified the wide-lane ambiguity when determining the satellite delays means that the problem to be solved when determining the satellite clocks only comprises a single ambiguity per passage, instead of two as in the conventional approaches. The precision of the model needed in order to generate the integer values is much less than in the case where no ambiguity is previously known. In particular, there is no need for a model for the ionospheric delay as it can be eliminated by combining the bi-frequency measurements. The fact that the ionospheric delay is not part of the model reduces the number of parameters to be estimated in comparison with the conventional methods; this constitutes a considerable advantage of the method according to this aspect of the invention.

The delays of the satellite and the clocks and possibly also the precise orbits of satellites can be broadcast (crypted or uncrypted) to the users' receivers by any appropriate means, e.g. terrestrial broadcasts, satellite broadcasts (e.g. from SBAS type satellites or from the radionavigation satellites themselves if the system has a signal that comprises data), by means of mobile telephones (e.g. from a telephonic relay station), via the internet, by pseudolites, by WIFI, by bluetooth, etc. It should be noted that the satellite delays remain essentially constant over time. They can therefore be saved in a database inside the receiver, which obtains them from this database when needed. The precise orbits and the clocks of the satellite, on the other hand, are data that vary with each epoch and consequently are preferably broadcast in real time.

Furthermore, the invention relates to the method that takes place at the level of any kind of receiver (e.g. a receiver of the end user or a network station receiver). The receiver receives the first and second radionavigation signals and executes a non-differentiated code measurement and a non-differentiated phase measurement for each of the first and second received signals. It then calculates a raw value of the wide-lane ambiguity of phase from the non-differentiated code measurements and from the non-differentiated phase measurements and obtains an internal satellite delay in question. Using the raw value and the internal satellite delay, it then determines an integer value of the wide-lane ambiguity.

According to a preferred embodiment of the method that takes place at the level of the receiver, the receiver obtains a precise orbit value and a satellite clock value for the satellite in question and calculates an integer value of the narrow-lane ambiguity by filtering from the non-differentiated code measurements, the non-differentiated phase measurements of the integer value of the wide-lane ambiguity, the orbit value, the satellite clock value and the model of the propagation distance between the satellite and the receiver.

It should be noted that the internal satellite delay can be obtained from an internal or external database of the receiver or from a message (crypted or uncrypted) broadcast by an SBAS satellite or sent by a radiotelephonic network or broadcast by terrestrial broadcasts or by any other suitable means of communication, e.g. the means mentioned above. The precise satellite orbits and the satellite clocks are preferably extracted from a message broadcast by an SBAS satellite or sent by a radiotelephonic network or broadcast by terrestrial broadcasts or by any other suitable means of communication.

BRIEF DESCRIPTION OF THE DRAWINGS

Other distinguishing features and characteristics of the invention will emerge from the detailed description of an advantageous illustrative embodiment presented below, on referring to the appended drawings. They show.

DETAILED DESCRIPTION OF THE INVENTION

Figure 1:
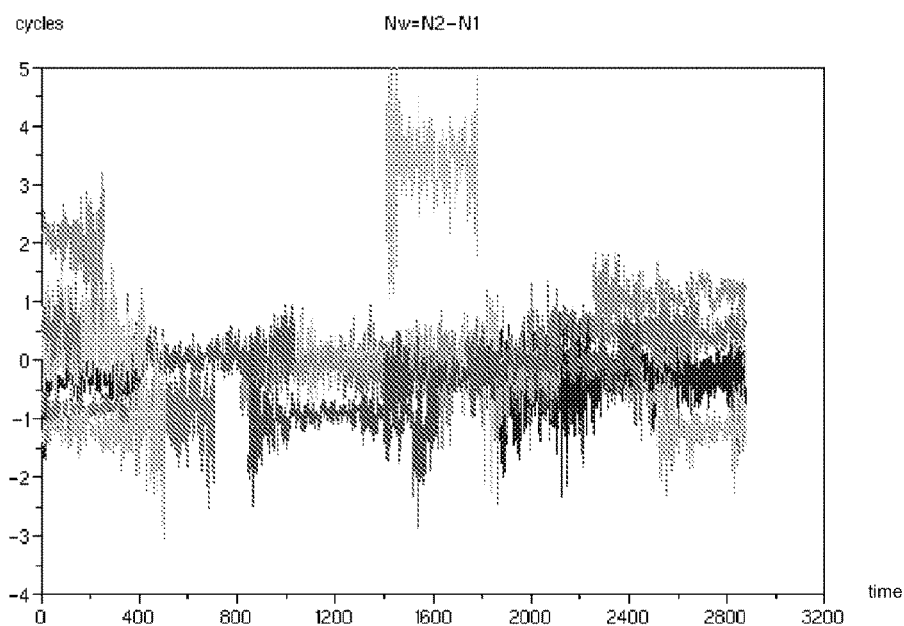
FIG. 1: raw values of the wide-lane ambiguity computed from code and phase measurements.

For each satellite that is visible from the receiver, then at the level of the receiver there are two non-differentiated code measurements (non-ambiguous), hereafter denoted $P_1$ and $P_2$, two non-differentiated measurements of phase (ambiguous), denoted $L_1$ and $L_2$, for the frequencies $f_1$ and $f_2$, respectively.

The following designations will be used below:

$$\gamma = \frac{f_1^2}{f_2^2}, \lambda_1 = \frac{c}{f_1}, \lambda_2 = \frac{c}{f_2}$$

where c represents the speed of light. For the bands L1 and L2 of the GPS system, then for example $f_1=154\,f_0$ and $f_2=120\,f_0$ where $f_0=10.23$ MHz. The convention will be used in which the code measurements $P_1$, $P_2$ are expressed in units of length, whereas the phase measurements $L_1$, $L_2$ are expressed in cycles.

The non-differentiated code and phase measurements fulfil the following equations:

$$P_1 = D + (\Delta c + \Delta\tau) + e + \Delta h$$

$$P_2 = D + \gamma(\Delta c + \Delta\tau) + \gamma e + \Delta h$$

$$\lambda_1 L_1 = D + (\Delta c + \Delta\tau) - e + \Delta h + \Delta b - \lambda_1 N_1$$

$$\lambda_2 L_2 = D + \gamma(\Delta c + \Delta\tau) - \gamma e + \Delta h + \Delta b - \lambda_2 N_2$$

wherein
- D represents a quantity comprising the geometric propagation distance, the tropospheric effects, the effects of the difference from the centre of the phase, the effects of the geometric rotation of the phase (phase wind-up), the relativity effects, etc.;
- e contains the ionospheric delay term, which varies as a function of the square of the frequency, and which is eliminated by the iono-free combination of the phase and code observables;
- $\Delta\tau = \tau_{rec} - \tau_{eme}$ contains the differential of the inter-frequency bias (TGD) between the transmitter and the receiver;
- $\Delta c = c_{rec} - c_{eme}$ contains the differential of the deviations from the centres of phase of the respective frequencies/iono-free centre of phase between the transmitter and the receiver;
- $\Delta h = h_{rec} - h_{eme}$ represents the difference between the clock of the receiver $h_{rec}$ and that of the transmitter $h_{eme}$;
- $\Delta b = b_{rec} - b_{eme}$ represents the difference of bias of the receiver $b_{rec}$ and of the transmitter $b_{eme}$ (the biases $b_{rec}$ and $b_{eme}$ correspond to the clock differences between the code and the phase); and where
- $N_1$, $N_2$ represent the (integer) phase ambiguities of the two carriers.

The (non ambiguous) phase differences between the transmission of the signals by the satellite and the reception by the receiver are written $L_1+N_1$ and $L_2+N_2$, where $N_1$ and $N_2$ represent the required (integer) ambiguities. Then $N_w = N_2 - N_1$, $N_w$ being the (integer) wide-lane ambiguity.

The ionospheric delay of the code is computed by:

$$eP = \frac{P_1 - P_2}{1 - \gamma}$$

Then:

$$\tilde{N}_1 = \frac{P_1 - 2eP}{\lambda_1} - L_1 \text{ and}$$

$$\tilde{N}_2 = \frac{P_2 - 2\gamma eP}{\lambda_2} - L_2$$

These quantities depend only on the measurements.

As the noise code measurements are such that, on the scale of one passage (time of visibility of one satellite), $\tilde{N}_1$ and $\tilde{N}_2$ are dispersed over ten or so cycles. Even by carrying out one average per passage, $N_1$ and $N_2$ cannot be estimated correctly. This is the reason why code measurements are used to determine the wide-lane ambiguity.

By expanding the equations for $\tilde{N}_1$ and $\tilde{N}_2$, one obtains:

$$\tilde{N}_1 = N_1 - \frac{2(\Delta c + \Delta\tau)}{\lambda_1} - \frac{\Delta b}{\lambda_1} \text{ and}$$

$$\tilde{N}_2 = N_2 - \frac{2\gamma(\Delta c + \Delta\tau)}{\lambda_2} - \frac{\Delta b}{\lambda_2}$$

The raw value $\tilde{N}_w$ of the wide-lane ambiguity is obtained by:

$$\tilde{N}_w = \tilde{N}_2 - \tilde{N}_1$$

$$= N_w - 2\left(\frac{\gamma}{\lambda_2} - \frac{1}{\lambda_1}\right)(\Delta c + \Delta\tau) + \left(\frac{1}{\lambda_1} - \frac{1}{\lambda_2}\right)\Delta b$$

$$= N_w - 2\frac{\lambda_2}{\lambda_1 \lambda_w}(\Delta c + \Delta\tau) + \frac{\Delta b}{\lambda_w}$$

where $\lambda_w$ is defined by $1/\lambda_w = 1/\lambda_1 - 1/\lambda_2$ and corresponds to the wavelength of the wide-lane (about 87 cm in the case of the bands L1 and L2). FIG. 1 shows an example of the curves of the raw values of wide-lane ambiguities resulting from (non-differentiated) code and phase measurements of a receiver. For $N_w$ one finds an expression of the form:

$$\langle \tilde{N}_w \rangle = N_w + \mu_{rec}^{w(t)} - \mu_{eme}^{w(t)}$$

On the scale of one passage, $\tilde{N}_w$ presents a sufficiently low noise (below the fraction of a cycle) such that $N_w$ can be estimated correctly.

Determination of the Internal Satellite Delays at the Level of a Reference Network At the level of a reference network comprising at least one station (a reference receiver), the raw values $\tilde{N}_w$ of the ambiguity are determined from the non-differentiated code and phase measurements. The raw values $\tilde{N}_w$ are evaluated by means of a estimator on one passage or on a part of the passage in order to reduce the noise, thereby yielding an estimated raw value, denoted $\langle \tilde{N}_w \rangle$. The estimator can be for example a means, a median or a robust estimator with possible rejection of aberrant measurements. This value $\langle \tilde{N}_w \rangle$ can be broken down into an integer value and two additional slowly variable values that are independent of the measurement and specific to the internal satellite delays and receiver:

$$\langle \tilde{N}_w \rangle = N_w + \mu_{rec}^{w(t)} - \mu_{eme}^{w(t)}$$

In the absence of additional hypotheses, this mixed integers-reals problem is singular, as the differences $\mu_{rec}^{w(t)} - \mu_{rec}^{w(t)}$ intervene in all the equations which means the $\mu_{eme}^{w(t)}$ and $\mu_{rec}^{w(t)}$ are defined only to within a real constant. Moreover, as $N_w$ is an integer per passage, there are also integer global singularities at the level of the $\mu_{eme}^{w(t)}$ and $\mu_{rec}^{w(t)}$.

The calculation process is begun by choosing a first station of the network, preferably one where it is known that the $\mu_{rec}^{w(t)}$ are stable over time. For this station, the value $\mu_{rec}^{w(t)}$ is arbitrarily fixed, e.g. on putting $\mu_{rec}^{w(t)}=0$. Then the passages of the satellites that are visible from this station are scanned. For each passage, we have $\langle \tilde{N}_w \rangle = N_w - \mu_{eme}^{w(t)}$, by definition from the first station (with $\mu_{rec}^{w(t)}=0$). $\langle \tilde{N}_w \rangle$ is then decomposed into an arbitrary integer (e.g. the nearest integer), denoted $N_w$, and a quantity that is not necessarily an integer corresponding to the difference $N_w - \langle \tilde{N}_w \rangle$, denoted as $\mu_{eme}^{w(t)}$. This yields the $\mu_{eme}^{w(t)}$ of the satellites that are visible from the first station.

For the set of satellites, for which are now known the internal delays $\mu_{eme}^{w(t)}$, we can estimate the delays $\mu_{rec}^{w(t)}$ of the other stations. This time, in the equation $\langle \tilde{N}_w \rangle N_w + \mu_{rec}^{w(t)} - \mu_{eme}^{w(t)}$, the value of $\mu_{eme}^{w(t)}$ is known. $\langle \tilde{N}_w \rangle + \mu_{eme}^{w(t)}$ is then decomposed into an arbitrary integer $N_w$ (from the new station) and the delay of the corresponding station $\mu_{rec}^{w(t)}$. These steps are repeated for all the satellites of the constellation and all the stations of the reference network. The values $\mu_{eme}$ are finally obtained which are coherent over all the reference network. The values $\mu_{eme}$ can be considered to be constant for at least one day.

Determination of the Clocks of the Satellite at the Level of a Reference Network After having determined the wide-lane ambiguity, at least one ambiguity ($N_1$ or $N_2$) remains unknown.

Since the wide-lane ambiguity is known, the phase ambiguity $N_1$ or $N_2$ can be resolved significantly more easily, especially in regard to the required model precisions.

The code measurements $P_1$ et $P_2$ are dependent on a plurality of parameters including the geometric distance between the transmission and receiving points, the ionospheric effects, the tropospheric effects together with the broadcasting and receiving clocks. A model that is sufficiently precise for these variables is required in order to identify the remaining ambiguities, and because of the clocks, a global resolution will be required for the network of receivers being treated.

Putting:

$$P_c = \frac{\gamma P_1 - P_2}{\gamma - 1} \quad \textit{(iono-free code)}$$

$$Q_c = \frac{\gamma \lambda_1 (L_1 + \hat{N}_1) - \lambda_2 (L_2 + \hat{N}_1 + N_w)}{\gamma - 1} \quad \textit{(iono-free phase)}$$

where $\hat{N}_1$ is an estimated, floating, rounded value of $N_1$, obtained e.g. by computing the average or the mean or by a robust estimator with the rejection of possible aberrant values, on the passage or a part of the passage, of the quantities $N_1$ estimated by the code and the phase:

$$\hat{N}_1 \approx \langle \tilde{N}_1 \rangle = \left\langle \frac{P_1 - 2eP}{\lambda_1} - L_1 \right\rangle$$

$\hat{N}_1$, is distanced from the true value of $N_1$ by ten or so cycles because of the measurement noise on the code.

The measured quantities of code and phase can be linked to the modelled geometric distance D by the following equations:

$$P_c = D + h_{rec} - h_{eme}$$

$$Q_c = D + \lambda_c \delta N_1 + h_{rec} - h_{eme}$$

with $\lambda_c = (\gamma \lambda_1 - \lambda_2)/(\gamma - 1)$, $h_{eme}$ and $h_{rec}$ corresponding to the respective clocks of the transmitters and receivers (one value per date), and $\delta N_1$ being the correction of ambiguity (one value per passage, $\delta N_1 = N_1 - \hat{N}_1$). The value of $\delta N_1$ will be identified by global filtering.

The quantities D correspond to a complete model of the propagation distance invoking the following elements:

- combination of the centres of bi-frequence phase: this is the iono-free combination of the antenna phase centres (L1 and L2) receiver and transmitter;
- the precise orbits of the satellites;
- law of attitude of satellites (law of nominal attitude in yaw);
- relativity effects due to the eccentricity of the satellites;
- precise model of the position of the receiver (with model of terrestrial tides);
- model of the tropospheric delay (a vertical delay per station with the folding function dependant on the site as defined in the Stanag);
- model of the wind-up (geometric rotation of phase).

The parameters estimated by the filter are:

- at each epoch, the clocks $h_{eme}$ and $h_{rec}$ of the satellites and stations;
- for each passage, a constant phase ambiguity $\delta N_1$ (without the constraint that it is an integer)
- a vertical tropospheric delay for each station, with a slow variation over time (typically a constant segment every 4 hours);
- the precise orbits of the satellites (if the precise orbits are not provided as input data).

The filter can be in the form of least squares or in the Kalman form, more compatible for a real-time treatment. The input values for the filtering are the non-differentiated values of iono-free code and iono-free phase, with their respective noise, which are of the order of 1 m for the code and 1 cm for the phase.

At the end of this step, the estimates of the identified residuals $\delta N_1$ are computed by $(Q_c - D - (h_{rec} - h_{eme}))/\lambda_c$. Some examples of the residuals $\delta N_1$ are shown in FIG. 1. (The $\delta N_1$ are not integers as no hypothesis was made on integers during the filtering.)

This filtering step serves above all to cleanly calculate the term D (geometric model). The clocks identified in this step are subsequently used as initial values, thereby permitting work to be made on the small variations of clocks, but this is not indispensable.

Having obtained the value D by filtering, the integer values of the $\delta N_1$ are searched for at the level of the reference network. The following equation is again used $$Q_c = D + \lambda_c \delta N_1 + h_{rec} - h_{eme} \quad (*)$$

where D now takes the value found by filtering. We note that the equation possesses a global inobservability. In fact, we can shift the values $\delta N_1$ concerning a given transmitter and the corresponding values $h_{eme}$ and/or $h_{rec}$ by retaining the valid equation:

$$Q_c = D + \lambda_c (\delta N_1 + \alpha) + (h_{rec} - \lambda_c \alpha) - h_{eme}$$

In this step the values $h_{eme}$ are computed by an iterative process starting with a first station (a first reference receiver), whose clock is taken as the reference clock, and by successively adding the stations in order to complete the whole of the network.

For the first station, one sets $\delta N_1 = 0$ and $h_{rec} = 0$. This choice is arbitrary and results in a set of $h_{eme}$ for the satellites that are visible from the first station such that the equation (*) is verified.

Figure 2:
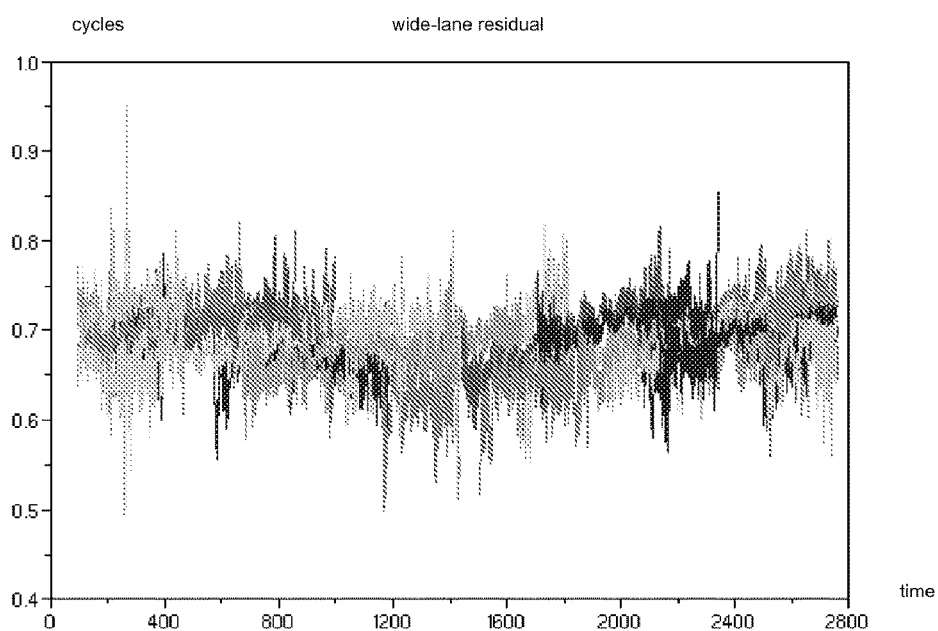
FIG. 2: the residuals obtained after correction of the raw values of the wide-lane ambiguity with the internal satellite delays.
Figure 3:
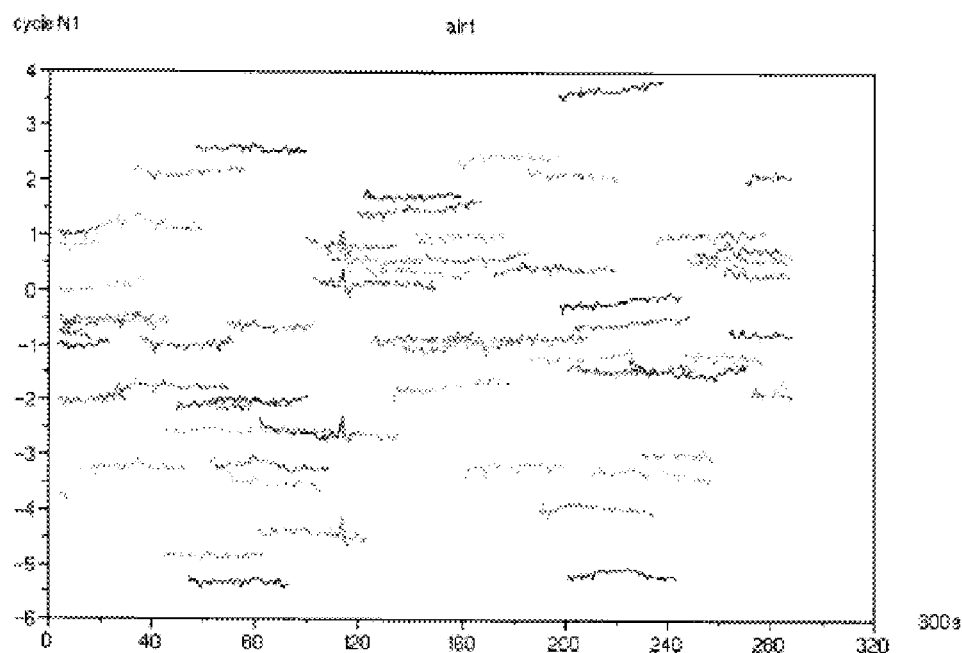
FIG. 3: the residuals of the narrow-lane ambiguity obtained by conventional filtering.
Figure 4:
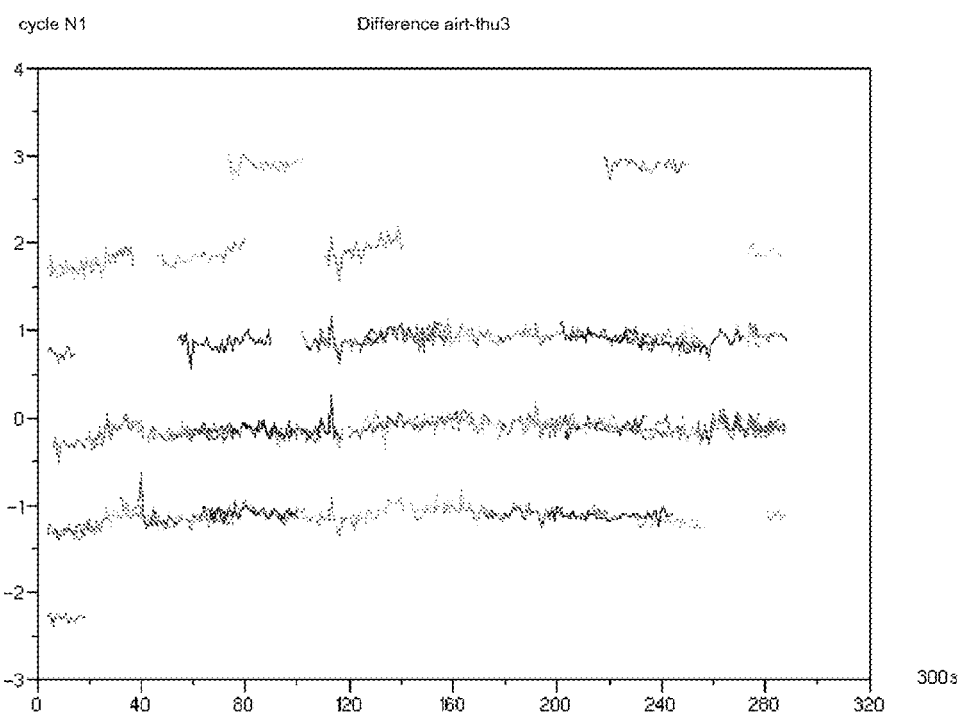
FIG. 4: the residuals of the narrow-lane ambiguity obtained by filtering and resolution of the ambiguities on the network.

The addition of a station is carried out as follows. With the set of $h_{eme}$ known before the addition of the station one calculates the residuals $\delta N_1 + h_{rec}/\lambda_c$ which have to be expressed in the form of an integer value per passage (the $\delta N_1$), and a real value at each epoch (corresponding to the clock $h_{rec}$ of the added station). FIG. 2 shows the residuals $\delta N_1 + h_{rec}/\lambda_c$ for a newly added station.

It can be seen that the residuals are separated by integer values and that their shift with respect to the nearest integer value is identical. One can therefore assert that the shift between the residual and the nearest integer value corresponds to $h_{rec}/\lambda_c$ and the integer value itself to $\delta N_1$.

It should be noted that for a new station, the satellite clocks, and therefore the residuals $\delta N_1 + h_{rec}/\lambda_c$ are only known, a priori, for a part of the passages. However, as $\delta N_1$ is constant per passage, it can be extended to the whole of the passage. The epochs at which a given satellite is visible from one station only partially correspond to the epochs at which the same satellite is visible for a neighbouring station. The more distant the stations, the smaller are the common observation periods. This implies that one always adds a neighbouring station to at least one of the preceding stations.

Finally, a set of $\delta N_1$ integers is identified for the group of the passages for all the network stations. The equation (*) can then be solved for the group of the passages and for all the network stations with the $h_{eme}$ and $h_{rec}$ as the sole unknowns.

The identification method for the $h_{eme}$ described in this part runs off-line, but a person skilled in the art would know how to implement an equivalent method running in real-time. For example by identifying an integer ambiguity at each arrival of a new passage, by collecting sufficient measurements of this passage, and on the assumption that the current solution for satellite clocks is itself an integer, then the integer value of the ambiguity would appear directly in the measurement residuals.

Solving the Phase Ambiguities at the Level of an (Isolated) Receiver

Any receiver can solve the wide-lane ambiguities if it knows the $\mu_{eme}$ of the visible satellites. The receiver makes non-differentiated code and phase measurements, and thereby finds the raw values of the wide-lane ambiguity (illustrated in FIG. 1). For one passage (or part of a passage) it calculates a mean raw value of the wide-lane ambiguity and deduces the integer wide-lane ambiguity $N_w$ by solving the equation:

$$\langle \tilde{N}_w \rangle = N_w + \mu_{rec}^{w(t)} - \mu_{eme}^{w(t)}$$

where $\mu_{eme}$ is now a known parameter. The receiver can obtain the values of the $\mu_{eme}$ by any available means. For example, it could download them from an external database (e.g. from an internet site). As these values vary very little over time, then once obtained they can be used for a very long time, on condition that they are stored inside the receiver. FIG. 2 shows the residuals $\langle \tilde{N}_w \rangle + \mu_{eme}^{w(t)} = N_w + \mu_{rec}^{w(t)}$ obtained after correction of the raw values of the wide-lane ambiguity of FIG. 1 with the respectively known internal satellite delays $\mu_{eme}$. It can be seen that the average or median value of the residual for each passage is found around a same value (not necessarily integer) common to all the passages (0.7 in the illustrated case). The fractional part of this common value therefore gives $\mu_{rec}$, whereas the integer part gives the integer wide-lane ambiguity $N_w$.

The solution for the narrow-lane ambiguity at the level of the (isolated) receiver is based on the equations $$P_c = D + h_{rec} - h_{eme}$$

$$Q_c = D + \lambda_c \delta N_1 + h_{rec} - h_{eme}$$

In order to determine $\delta N_1$, the receiver needs to know the satellite clocks as well as the precise orbits for a given observation time (the precise orbits are part of the model for D). These satellite clocks and/or the precise orbits are preferably broadcast by terrestrial broadcast or from an SBAS satellite (Satellite-Based Augmentation System).

Firstly, the receiver determines the value of D by filtering, based on an analogous model to that mentioned previously. During this calculation step for D, the receiver is generally required to remain stationary. Secondly, the receiver estimates its receiver clocks and the $\delta N_1$. It then arrives at the values for $N_1$ by $N_1 = \delta N_1 + \hat{N}_1$ and at the values for $N_2$ by $N_2 = N_w + N_1$.

The invention claimed is:

1. Method of processing radionavigation signals that originate from a satellite of a constellation of radionavigation satellites, said satellite broadcasting at least a first radionavigation signal on a first frequency and a second radionavigation signal on a second frequency that is different from the first, in which method one determines, at the level of a reference network comprising at least one reference receiver, from which said satellite is visible, an internal satellite delay and an integer wide-lane phase ambiguity value for said reference receiver, this determination of the internal satellite delay and of the integer wide-lane phase ambiguity value comprising the steps:

receiving said first and second radionavigation signals at the level of said reference receiver;

by means of said reference receiver and for each of the first and second received signals, executing a non-differentiated code measurement and a non-differentiated phase measurement;

computing a raw value for the wide-lane phase ambiguity from the non-differentiated code measurements and from the non-differentiated phase measurements;

fixing the internal satellite delay together with the integer wide-lane phase ambiguity value based on said raw value for said reference receiver.

2. Method according to claim 1, the reference network comprising a plurality of reference receivers, from which each time a plurality of satellites of said constellation are visible, each of these satellites broadcasting at least one first radionavigation signal on said first frequency and a second radionavigation signal on said second frequency, in which method one determines, for each available combination satellite/reference receiver, in a coherent manner at the level of the reference network, said internal satellite delay and said integer wide-lane phase ambiguity value on the basis said raw value for the wide-lane ambiguity computed from the code and phase measurements executed for each of the first and second signals originating from the respective satellite with by the respective reference receiver.

3. Method according to claim 1 comprising the step of broadcasting the determined internal satellite delay.

4. Method of processing radionavigation signals that originate from a satellite of a constellation of radionavigation satellites, said satellite broadcasting at least a first radionavigation signal on a first frequency and a second radionavigation signal on a second frequency that is different from the first, said method comprising, at the level of a reference network comprising one or a plurality of reference receivers, from which said satellite is visible, the steps:

receiving said first and second radionavigation signals at the level of said reference receiver or receivers;

by means of said reference receiver or receivers and for each of the first and second received signals, executing a non-differentiated code measurement and a non-differentiated phase measurement;

determining a satellite clock value of said satellite from the non-differentiated code measurements, the non-differentiated phase measurements, one or a plurality of integer wide-lane phase ambiguity values as well as a model of a propagation distance between said satellite and said reference receiver or receivers.

5. Method according to claim 4 wherein determining the satellite clock value comprises the steps:
obtaining an internal satellite delay concerning said satellite; and
determining an integer wide-lane phase ambiguity value based on a raw value for a wide-lane phase ambiguity and said internal satellite delay.

6. Method according to claim 4 wherein determining the satellite clock value comprises an estimation of model parameters for the propagation distance using the code measurements, the phase measurements and one or a plurality of integer wide-lane phase ambiguity values and, subsequently, an estimation of said satellite clock value from the estimated parameters.

7. Method according to claim 6 wherein the estimation of the model parameters for the propagation distance includes determining a precise orbit concerning said satellite.

8. Method according to claim 4 comprising broadcasting the determined satellite clock value.

9. Method according to claim 8 comprising broadcasting a determined precise orbit.

10. Method of processing radionavigation signals that originate from a satellite of a constellation of radionavigation satellites, said satellite broadcasting at least a first radionavigation signal on a first frequency and a second radionavigation signal on a second frequency that is different from the first, said method comprising, at the level of a receiver, from which said satellite is visible, the steps:
receiving said first and second radionavigation signals;
for each of the first and second received signals, executing a non-differentiated code measurement and a non-differentiated phase measurement;
computing a raw value for a wide-lane phase ambiguity from the non-differentiated code measurements and the non-differentiated phase measurements;
obtaining an internal satellite delay concerning said satellite; and
determining an integer wide-lane phase ambiguity value based on said raw value and said internal satellite delay.

11. Method according to claim 10 wherein said internal satellite delay is obtained from a database.

12. Method according to claim 10 wherein said internal delay is extracted from a message broadcast by an SBAS satellite or sent by a radiotelephonic network or broadcast by terrestrial broadcast.

13. Method according to claim 10 comprising the steps:
obtaining an orbit value and a satellite clock value concerning said satellite;
estimating an integer value of a narrow-lane ambiguity by filtering from the non-differentiated code measurements, the non-differentiated phase measurements of said integer value for the wide-lane ambiguity, said orbit value, said satellite clock value as well as a model of the propagation distance between said satellite and said receiver.

14. Method according to claim 13 wherein said orbit value and said clock value are obtained from a database.

15. Method according to claim 13 wherein said orbit value and said clock value are extracted from a message broadcast by an SBAS satellite or sent by a radiotelephonic network or broadcast by terrestrial broadcast.

* * * * *